Patented Apr. 3, 1934

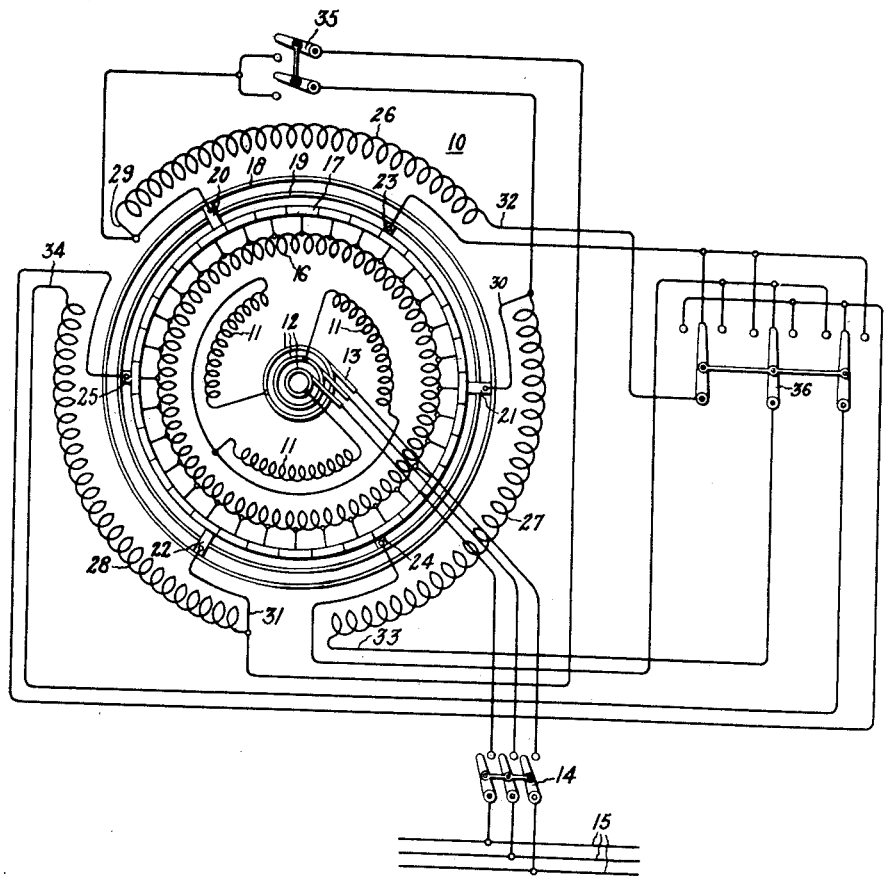

1,953,803

UNITED STATES PATENT OFFICE 1,953,803

ALTERNATING CURRENT COMMUTATOR MACHINE

Georg Günner, Berlin-Siemensstadt, Germany, assignor to General Electric Company, a corporation of New York Application May 1, 1933, Serial No. 668,834
In Germany May 10, 1932

13 Claims. (Cl. 172—274)

My invention relates to alternating-current commutator machines. The principal object of my invention is to provide a method of braking an alternating-current commutator motor after it has been disconnected from its energizing source. Another important object of my invention is to provide an arrangement for carrying out my method irrespective of the position of the commutator brushes when the motor is disconnected from its energizing source.

I prefer to describe my invention in connection with a three-phase brush-shifting alternating-current commutator motor of the type disclosed in United States Reissue Patent No. 14,031, Schrage, December 4, 1915, and assigned to the assignee of this application. However, I wish it clearly understood that this is done merely for illustrative purposes and that my invention is not limited to this type of motor.

Mechanical brakes are generally used, often in combination with magnetic brake lifters, for quickly stopping a machine driven by an alternating-current commutator motor of the type described in the above-mentioned patent. Means of this kind are not only complicated and costly, but are also subjected to considerable wear. My invention largely overcomes these disadvantages by providing a method of operation which produces a braking action by causing the motor to act as a self-excited generator after it is disconnected from its energizing source. My invention also provides a simple and inexpensive arrangement which is operated after the motor is disconnected from its energizing source and which so reconnects the secondary winding of the motor to its commutated armature winding that their magnetic axes are displaced from each other. This causes the motor to build up voltage as a self-excited generator and to circulate a current through these windings until the armature has practically ceased rotating, thus producing an effective braking action.

My invention, however, will be best understood from the following description when considered in connection with the accompanying drawing, while those features of my invention which are believed to be novel and patentable are pointed out in the appended claims.

The single figure of the drawing represents a preferred embodiment of my invention as applied to a brush-shifting alternating-current motor of the type described in the above-mentioned patent.

In this figure, the motor is represented generally by 10. This motor has a rotatable three-phase primary winding 11 connected through collector rings 12, brushes 13, and a switch 14 to a source of three-phase alternating current represented by 15. A three-phase motor is shown only for ease of description, but the invention is not limited thereto. The motor also has a rotatable commutated armature winding 16 inductively related to primary winding 11, the commutator being represented by 17. I prefer to illustrate two independent windings 11 and 16, but I wish it clearly understood that my invention will apply equally as well when these two windings are replaced by a single winding connected both to collector rings and to a commutator, as shown for example in Fig. 2 of the previously mentioned patent. I therefore wish it clearly understood that in the claims wherever I call for a motor having a primary winding and a commutated armature winding, I mean to include not only a motor having two such separate windings, but also a motor having a single winding for performing the functions of two such separate windings. Each of two movable brush yokes 18 and 19 carries three groups of brushes resting on the commutator, the brushes of each group being spaced substantially 120 electrical degrees apart. Thus, brush yoke 18 carries brushes 20, 21, and 22, which are spaced substantially 120 electrical degrees apart, and brush yoke 19 carries brushes 23, 24, and 25, which are spaced substantially 120 electrical degrees apart. The motor also has three independent stationary secondary windings 26, 27, 28, respectively. To facilitate the remainder of the description, I will label the ends of each secondary winding. Thus, one group of corresponding ends of windings 26, 27, and 28 are represented by 29, 30, and 31, respectively, whereas the other group of corresponding ends of these windings are represented by 32, 33, and 34, respectively. The groups of corresponding ends 29, 30, and 31 are connected to brushes 20, 21, and 22, respectively, which are carried by yoke 18. The ends 29, 30, and 31 may also be directly connected together externally of armature winding 16 by closing a switch 35. The remaining end of each secondary winding may be selectively connected to any one of the three brushes carried by yoke 19 by closing a three-way switch 36 in the proper position, each blade of this switch being adapted to make contact with any one of three stationary contacts. Thus, when switch 36 is closed in its central position, as shown, end 32 of winding 26 is connected to brush 23, end 33 of winding 27 is connected to brush 24, and end 34 of winding 28 is connected to brush 25. When switch 36 is closed in its right-hand position, end 32 of winding 26 is connected to brush 24, end 33 of winding 27 is connected to brush 25, and end 34 of winding 28 is connected to brush 23. When switch 36 is closed in its left-hand position, end 32 of winding 26 is connected to brush 25, end 33 of winding 27 is connected to brush 23, and end 34 of winding 28 is connected to brush 24.

A description of the operation of the above-mentioned apparatus follows. During normal operation of motor 10 as a motor, each of its secondary windings is connected across two commutator brushes respectively carried by yokes 18 and 19, hence one of the closed positions of switch 36 should be its motor operating position. I will assume that switch 36 is in its motor operating position when it is closed in its central position. Now assume that motor 10 is operating as a motor driving some apparatus (not shown). Switch 35 will be open, and switch 36 will be closed in its central position, as shown. Secondary winding 26 will be connected across brushes 20 and 23, secondary winding 27 will be connected across brushes 21 and 24, and secondary winding 28 will be connected across brushes 22 and 25. The speed of the motor will be varied by shifting one or both of yokes 18 and 19 so as to vary the magnitude of the voltage impressed by armature winding 16 on each secondary winding, this being well understood by those skilled in the art to which this invention relates. The magnitude of the voltage impressed on each secondary winding depends on the amount that the two commutator brushes connected thereto are separated, whereas the time phase of this impressed voltage depends on the positions of these two brushes on commutator 17 with respect to the axis of the secondary winding connected thereto. Thus, for example, the magnitude of the voltage impressed on secondary winding 26 depends on the amount that brushes 20 and 23 are separated, since it is the difference of potential between them that is impressed on the winding, whereas the time phase of this impressed voltage depends on the positions of these brushes on commutator 17 with respect to the axis of this winding.

Assume that motor 10 is operating as a motor with each pair of brushes connected to a secondary winding positioned very close to each other whereby the motor is running at or nearly at its synchronous speed. Now assume that it is desired to shut down the motor and bring it and the apparatus driven thereby quickly to rest. Switch 14 will be opened and simultaneously therewith switch 35 will be closed, or, preferably, switch 35 will be closed first and immediately thereafter switch 14 will be opened in order to be more certain of having sufficient magnetism in the motor at the instant switch 35 is closed, whereby the motor will be more certain to build up as a self-excited generator as hereinafter described. Switch 36 will be left closed in its motor operating position, and the commutator brushes will be left in the positions they occupied just prior to the opening of switch 14. The closing of switch 35 connects secondary windings 26, 27, and 28 in Y, since it connects together their corresponding ends 29, 30, and 31. Although each secondary winding still remains connected across two commutator brushes, yet the fact that the secondary windings are now connected in Y causes the time phase of the voltage impressed on each secondary winding to be different from the time phase of the voltage impressed thereon when motor 10 was operating as a motor with its commutator brushes at approximately their synchronous speed position. Thus, for example, although secondary winding 26 is still connected across brushes 20 and 23, the fact that the secondary windings are Y-connected causes the voltage impressed on secondary winding 26 to be practically that between brush 23 and an imaginary Y point in winding 16 having the potential of the Y point of the secondary windings. Hence the time phase of the voltage impressed on winding 26 differs materially from the time phase of the difference of potential between brushes 20 and 23. The same is correspondingly true of secondary windings 27 and 28. This change in time phase of the voltage impressed on each secondary winding causes the magnetic axis of the entire secondary winding to be displaced from the magnetic axis of armature winding 16 with the commutator brushes at approximately their synchronous speed position when current flows through these windings. This displacement of the two axes, however, together with the residual magnetism in the motor and the rotation of its armature winding 16 due to inertia, causes the motor to function as a self-excited generator. Armature winding 16, therefore, generates a voltage and causes a current to circulate therethrough and the secondary windings, whereas the latter provide the magnetic field for this generator action. Thus, an effective braking action is produced until the armature winding has nearly ceased rotating.

During the braking operation the commutator brushes 20, 21, and 22 were short-circuited by switch 35. In some cases this may cause objectionable sparking. Also, the fact that each secondary winding remains connected across two commutator brushes during the braking operation may in some cases somewhat reduce the effectiveness of this braking action. Neither of these objectionable features should be present in most cases, but where either or both are present they may be avoided by employing any suitable means to prevent brushes 20, 21, and 22 from being short-circuited by switch 35 during the braking operation. I have not shown such means because the provision thereof will be obvious to those skilled in this art whenever it becomes desirable, and because I wish to show the simplest possible arrangement, which I believe will be satisfactory in most cases. What has been said in this paragraph also applies to the braking operations hereinafter described, and will, therefore, not be repeated.

Assume that motor 10 is again operating as a motor with switch 35 open, switch 36 closed in its central position, and that the two commutator brushes connected to each secondary winding have been sufficiently separated so that the motor is running, for example, at considerably below its synchronous speed. To shut the motor down and bring it quickly to rest, open switch 14 and close switch 35 as heretofore described, and move switch 36 from its central closed position to its right or left-hand closed position, depending on the motor connections. I will assume that these connections are such as to require that switch 36 be closed in its right-hand position and that this is done. Secondary windings 26, 27, and 28 will now be connected in Y and their ends 32, 33, and 34 will now be connected to commutator brushes 24, 25, and 23, respectively. The time phases of the voltages impressed on secondary windings 26, 27, and 28 will be approximately those of the voltages between brushes 24, 25, and 23, respectively, and the previously mentioned imaginary Y point in armature winding 16. The time phase of the voltage impressed on each secondary winding will now not only be different from the time phase of the voltage impressed thereon just before switch 14 was opened, but will also be such that the magnetic axis of the entire secondary winding will be displaced from the magnetic axis of armature winding 16 with the commutator brushes in their last-mentioned position when current flows through these windings. This displacement of the two magnetic axes, however, causes a current to flow through these two windings for reasons previously described, hence producing an effective braking action.

If, in the above-assumed case, motor 10 had been running as a motor at considerably above its synchronous speed, with the two commutator brushes connected to each secondary winding correspondingly separated, then switch 14 would be opened and switch 35 closed, as heretofore described, the commutator brushes would not be moved, and switch 36 would be moved to its left-hand closed position. The time phases of the voltages impressed on secondary windings 26, 27, and 28 would then be approximately those of the voltages between brushes 25, 23, and 24, respectively, and the previously mentioned imaginary Y point in armature winding 16. This will cause the magnetic axis of the entire secondary winding to be displaced from the magnetic axis of armature winding 16 with the commutator brushes in their last mentioned position when current flows through these windings. This displacement, however, will cause a current to flow through these windings for reasons previously described, and will, therefore, produce an effective braking action.

I will now describe how to obtain an effective braking action without manipulating switch 36, and even without using this switch. Thus assume that the secondary winding ends 32, 33, and 34 are directly connected to brushes 23, 24, and 25, respectively. Assume that motor 10 is running as a motor with its commutator brushes at or near their synchronous speed position, and that it is desired to shut down the motor and bring it quickly to rest. This is accomplished by opening switch 14 and closing switch 35 as heretofore described. Motor 10 will operate as a self-excited generator because the connections between its secondary windings and commutator brushes are the same as when switch 36 is closed in its central position, hence an effective braking action will be produced. Now, assume that motor 10 is operating as a motor at considerably below its synchronous speed with the two commutator brushes connected to each secondary winding correspondingly displaced, and that it is desired to shut down the motor and bring it quickly to rest. This is accomplished by opening switch 14 and closing switch 35 as heretofore described, and moving brush yoke 19 clockwise approximately 120 electrical degrees, or counter-clockwise approximately 240 electrical degrees. This will bring the positions of brushes 23, 24, and 25 to those occupied by brushes 24, 25, and 23, respectively, before the brush yoke 19 was moved, hence the secondary winding ends 32, 33, and 34 will be connected to commutator brushes whose positions on the commutator are the same as when switch 36 was employed and was closed in its right-hand position. From this it follows that an effective braking action will be produced. It should now be clear that if motor 10 is running as a motor at considerably above its synchronous speed with the two commutator brushes connected to each secondary winding correspondingly displaced and it is desired to shut down the motor and bring it quickly to rest, it is only necessary to open switch 14 and close switch 35 as heretofore described, and move brush yoke 19 counter-clockwise approximately 120 electrical degrees, or clockwise approximately 240 electrical degrees.

It will now be obvious that my invention provides a simple, inexpensive and effective braking arrangement in which there is practically nothing to wear out or get out of order.

In accordance with the provisions of the patent statutes, I have described the principles of operation of my invention together with the apparatus which I now consider to represent the best embodiment, but I desire to have it understood that the apparatus shown and described is only illustrative and that the invention may be carried out by other means.

What I claim as new and desire to secure by Letters Patent of the United States, is:

1. In combination, an alternating-current motor having a primary winding, relatively rotatable secondary and commutated windings, and a plurality of brushes bearing on its commutator and circumferentially spaced apart thereabout, means for connecting and disconnecting said primary winding to and from an alternating-current source, means for connecting said secondary winding to said commutator brushes for normal motor operation, and means for reconnecting said secondary winding to said commutator brushes so that the existence of residual flux in said motor and the relative rotation of its secondary and commutated windings, after said primary winding has been disconnected from said source, causes the commutated winding so to energize the secondary winding that their magnetic axes are displaced from each other, thereby causing said motor to act as a self-excited generator.

2. In combination, an alternating-current motor having a primary winding, a plurality of independent secondary windings, a commutated armature winding, and a plurality of brushes bearing on its commutator, said secondary windings and armature winding being relatively rotatable, means for connecting each secondary winding across two commutator brushes, and means other than said armature winding for connecting an end of one secondary winding to the corresponding end of each of the other secondary windings.

3. In combination, a three-phase alternating-current motor having a three-phase rotatable primary winding, three independent stationary secondary windings, a rotatable commutated armature winding inductively related to said primary winding, and two shiftable brush yokes each having at least three circumferentially spaced apart brushes bearing on the commutator, means for connecting each secondary winding across two commutator brushes respectively carried by said two brush yokes, and means other than said armature winding for connecting an end of one secondary winding to the corresponding end of each of the other secondary windings.

4. In combination, a polyphase alternating-current motor having a primary winding, a secondary winding, and a commutated armature winding with a plurality of circumferentially displaced brushes bearing on its commutator, said secondary winding and armature winding being relatively rotatable, and means for selectively connecting said secondary winding to said commutator brushes to impress thereon any one of three time phase displaced voltages generated by said armature winding.

5. In combination, an alternating-current motor having a primary winding, a secondary winding, and a commutated armature winding with at least three brushes bearing on its commutator, at least two of said brushes being circumferentially displaced about the commutator, said secondary winding and armature winding being relatively rotatable, means for selectively connecting one end of said secondary winding to either of the two spaced apart commutator brushes, and means for connecting the other end of said secondary winding to the third commutator brush.

6. In combination, an alternating-current motor having a primary winding, three secondary windings, and a commutated armature winding with at least three circumferentially spaced apart brushes bearing on its commutator, said secondary windings and armature winding being relatively rotatable, means for connecting an end of one secondary winding to the corresponding end of each of the other secondary windings, and means for selectively connecting the remaining end of each secondary winding to any one of said three circumferentially spaced apart commutator brushes.

7. In combination, an alternating-current motor having a primary winding, a plurality of independent stationary secondary windings, and a rotatable commutated armature winding with two groups of brushes bearing on its commutator, each group comprising a plurality of circumferentially spaced apart brushes, means for selectively connecting one end of each secondary winding to either of two commutator brushes of one group, means for respectively connecting the remaining end of each secondary winding to a commutator brush of the other group, and means other than said armature winding for connecting together said remaining ends of the secondary windings.

8. In combination, a three-phase alternating-current motor having a rotatable three-phase primary winding, a rotatable commutated armature winding with two groups of brushes bearing on its commutator, each group comprising at least three circumferentially spaced apart brushes, said armature winding being inductively related to said primary winding, and three independent stationary secondary windings, means for selectively connecting one end of each secondary winding to any one of the three commutator brushes of one group, means for respectively connecting the remaining end of each secondary winding to a commutator brush of the other group, and means other than said armature winding for connecting together said remaining ends of the secondary windings.

9. The method of braking a rotating alternating-current motor having a primary winding connected to an alternating-current source, a commutated armature winding inductively related to the primary winding with its commutator brushes positioned comparatively remote from their synchronous speed position, and having a secondary winding connected to the commutator brushes, the armature and secondary windings being relatively rotatable, which comprises removing the alternating voltage applied to the primary winding, and so energizing the secondary winding from the armature winding that the magnetic axis of the secondary winding is displaced from the magnetic axis of the armature winding, whereby the motor operates as a self-excited generator.

10. A method of braking a rotating alternating-current motor having a primary winding connected to an alternating-current source, a commutated armature winding inductively related to the primary winding, and a secondary winding connected to brushes bearing on the commutator, the armature and secondary windings being relatively rotatable, which comprises removing the alternating voltage applied to the primary winding, and impressing on the secondary winding a voltage generated by the armature winding whose time phase differs from the time phase of the armature winding voltage impressed thereon during motor operation immediately prior to removal of the alternating voltage applied to the primary winding.

11. The method of braking a rotating alternating-current motor having a primary winding connected to an alternating-current source, a commutated armature winding inductively related to the primary winding, and a plurality of independent secondary windings connected to brushes bearing on the commutator, the armature and secondary windings being relatively rotatable, which comprises removing the alternating voltage applied to the primary winding, and establishing a common connection outside the armature winding between a corresponding end of each secondary winding.

12. The method of braking a rotating alternating-current motor having a primary winding connected to an alternating-current source, a commutated armature winding inductively related to the primary winding, a plurality of brushes bearing on the commutator, and a plurality of independent secondary windings each connected across two commutator brushes, the armature and secondary windings being relatively rotatable, which comprises removing the alternating voltage applied to the primary winding, establishing a common connection outside the armature winding between a corresponding end of each secondary winding, and changing the connections between the other corresponding ends of the secondary windings and the commutator brushes to cause the magnetic axis of the secondary windings to be displaced from the magnetic axis of the armature winding, whereby the motor operates as a self-excited generator.

13. A method of braking a rotating alternating-current motor having a rotatable primary winding connected to an alternating-current source, a rotatable commutated armature winding inductively related to the primary winding and having two groups of relatively movable brushes bearing on its commutator, each group consisting of a plurality of circumferentially spaced apart brushes, and a plurality of independent stationary secondary windings each connected across two commutator brushes respectively located in the two groups, which comprises removing the alternating voltage applied to the primary winding, establishing a common connection outside the armature winding between a corresponding end of each secondary winding, and shifting the group of commutator brushes connected to the other corresponding ends of the secondary windings an amount sufficient to cause the magnetic axis of the secondary windings to be displaced from the magnetic axis of the armature winding, whereby the motor operates as a self-excited generator.

GEORG GÜNNER.